United States Patent Office 3,231,541
Patented Jan. 25, 1966

3,231,541
POLYOLEFINS STABILIZED WITH A COMBINATION OF A DIALKYL THIODIPROPIONATE AND A CYANO-ETHYL COMPOUND
Cornelio Caldo, Terni, Italy, assignor to Montecatini Societa Generale per l'Industria Mineraria e Chimica, Milan, Italy
No Drawing. Filed Nov. 7, 1961, Ser. No. 150,656
Claims priority, application Italy, Nov. 10, 1960, 19,391/60
9 Claims. (Cl. 260—45.85)

The present invention relates to stabilized polymeric compositions of poly-alpha olefins and to a process for stabilizing fibres, films and other manufactured articles made of crystalline olefin polymers, particularly polypropylene.

It is known that polyolefin materials undergo a certain degradation during hot working, particularly in the presence of atmospheric oxygen.

It is also known that manufactured articles of crystalline polyolefins are sensitive to the action of light and to thermal treatment.

This degradative action can be reduced by the addition of various protective substances to the polyolefin polymer, generally during the preparation of fibres, films, etc. from the polyolefin.

Typical protective substances, always used in small proportion, include amines, aminophenols, chelates of transition metals (e.g. Ni), organotin compounds, triazolic compounds, zinc compounds, dithiocarbamates, phenols, phosphites, mercaptans, oximes, polyquinolines, sulfur derivatives, silicones, thiophosphites and the like.

In a recent patent application, namely, Italian patent No. 619,532 filed on October 27, 1959, there was described the stabilization of crystalline polyolefin fibres, films and the like by adding to the polyolefins organic or inorganic derivatives containing the cyano-ethyl group, —CH$_2$—CH$_2$—CN in an amount from about 0.02 to 2% of the overall composition.

The stabilization of polyolefins with β-thioethers of propionic acid esters has also been described, e.g., U.S. Patents 2,397,960; 2,397,976; 2,416,052; 2,456,227; 2,462,633; 2,468,725; 2,497,320; 2,519,755; 2,563,835; 2,564,106; 2,822,348; Belgian Patent 577,252; Italian Patent 435,962; Italian patent application 5,590/59, now Italian Patent 606,804.

I have now surprisingly found, and this is an object of the present invention, that a mixture of organic and inorganic derivatives containing the cyanoethyl group, with β-thioethers of a propionic acid ester, more particularly, lauryl thiodipropionate, presents a high stabilizing action against the action of heat and, in several instances, against aging and light, when it is mixed, in an amount up to 2%, by weight, with a crystalline olefin polymer used for producing fibres or films. A more preferred range is from about 0.2 to 1% by weight.

The stabilizing mixture, which exhibits a synergistic action, also functions as a stabilizer for compositions of polyolefins and compounds containing basic nitrogen atoms such as those formed from polypropylene and polyalkyleneimine disclosed in U.S. patent application Serial No. 702,430, filed December 12, 1957, now Patent Number 3,107,228, which compositions are used to produce textile fibres having improved tinctorial characteristics.

According to the present invention, polymeric compositions which are stable against the action of heat, aging and light, are obtained by mixing (a) a crystalline polyolefin, more particularly polypropylene and (b) an amount of from 0.2 to 2% (by weight of the polyolefin) of a mix of organic or inorganic derivatives containing the cyano-ethyl group, and the β-thioether of an ester of propionic acid, this β-thioether having the formula

ROOC—CH$_2$—CH$_2$—S—X in which R is an alkyl or cycloalkyl radical (such as n-butyl or isobutyl, amyl, heptyl, nonyl, decyl, lauryl, glycyl, cinnamyl, capryl, benzyl, allyl, cetyl, stearyl, palmityl, cyclohexyl group, or the like) and X is either (1) A hydrocarbon group, e.g., an alkyl group such as methyl ethyl, propyl, butyl, lauryl; and aryl group such as phenyl, benzyl, naphthyl; a cycloalkyl group such as cyclohexyl, etc.;
(2) An oxygenated hydrocarbon group, e.g., an alcoholic or hydroxy groups such as hydroxymethyl, hydroxyethyl, hydroxybutyl, parahydrophenyl; and ether group such as methoxymethyl, methoxyethyl and ethoxyethyl, paramethoxyphenyl; acid and ester group such as carboxymethyl, carboxyethyl, carboxypropyl, carboxybutyl; an aldehyde group such as aldehyde-ethyl (—CH$_2$—CH$_2$—CHO)
(3) A sulfur-containing hydrocarbon group such as mercaptoethyl, mercaptopropyl, mercaptobutyl, mercaptoisobutyl;
(4) A sulfoxygenated group such as ethyl-thiopropionic, propylthiopropionic and the like;
(5) Or a sulfonitrogen-containing hydrocarbon group, e.g., 3-benzothiazyl mercaptopropionic.

In the stabilizer mix the cyano-ethyl compound can be present in the amount of from 1 to 99% of the total stabilizers.

The application of the stabilizing compounds according to the invention is generally carried out by mixing such compounds with polypropylene while agitating. However, the stabilizers can also be added by other methods, such as by mixing the polyolefin with a solution of the stabilizer in a suitable solvent and then evaporating the solvent, or by adding the stabilizer to the polyolefin at the end of the polymerization.

It is also possible to obtain the stabilizing action by applying the stabilizing compounds directly onto the manufactured article, e.g., by immersing the article in a stabilizer solution or dispersion and then evaporating the solvent or dispersing medium.

The stabilizing compounds of the present invention exhibit a good compatibility with polyolefins in the molten state and have no staining action thereon.

The stabilized compositions of the present invention are particularly suitable for preparing mono- and plurifilaments, staple, dyeable yarns, bulky yarns, films, tapes, shaped articles and the like.

The addition to the composition before the spinning thereof of an inorganic salt of stearic acid, e.g., calcium stearate, which salt functions as an antacid, improves the stability characteristics of the composition.

The following examples will further illustrate the present invention without limiting its scope. All parts are by weight unless otherwise stated. The polypropylene used in these examples was crystalline polypropylene consisting prevailingly of isotactic macromolecules as defined by Natta, e.g., U.S. Patent 2,882,263.

*Example 1*

In a Werner type mixer a homogeneous mixture is prepared at troom temperature from 9.9 kg. of polypropylene (prepared with the aid of stereospecific catalysts and having an intrinsic visocosity [η], as determined in tetrahydronaphthalene at 135° C., of 1.34, a residue from heptane extraction of 93.4%, and an ash content of 0.028%) 50 g. of 1,4-dicyanoethoxy-benzene, and 50 g. of lauryl β-thiodipropionate.

The polymer-stabilizer mix, when subjected to melting in a test tube kept in a thermostatic bath at 250° C. for 10 minutes, results in a nearly colorless molten mass.

The mix is spun in a melt spinning device under the following conditions:

| | |
|---|---|
| Screw temperature | 240° C. |
| Head temperature | 230° C. |
| Spinneret temperature | 230° C. |
| Spinneret type | 60/0.8 x 16 mm. |
| Maximum pressure | 40 kg./cm.$^2$ |
| Winding speed | 250 meters/min. |

The fibers are stretched with a stretching ratio of 1:5.3 at 130° C. The serimetric characteristics of the fibres obtained are as follows:

| | |
|---|---|
| Tenacity | g./den__ 3.4 |
| Elongation | percent__ 22 |

By the passage from stabilized polymer to stabilized fibre the intrinsic viscosity [$\eta$] is lowered to 94% to the starting value, whereas the intrinsic viscosity of the same polymer without addition to stabilizer is lowered to 74.5% of the initial value.

The stabilized yarn, when exposed for 15 hours to the action of heat in an oven provided with air circulation at 120° C. (accelerated thermal aging test), remains virtually unaltered in its characteristics while the non-stabilized yarn, when subjected to the same test, becomes completely brittle.

After exposure to an ultra violet mercury lamp for 20 hours, the stabilized yarn maintains 42% of the initial tenacity, whereas in the non-stabilized yarn control the tenacity is reduced to 32% of the initial value.

After exposure to the sun light till variation of the 7th tone in the standard blue scale (290 hours of actual exposure in the summer at Terni) the stabilized yarn maintains 75% of the initial tenacity, whereas in the non-stabilized yarn control the tenacity is reduced to 28% of the initial value.

*Example 2*

In a Werner type mixer a homogeneous mixture is prepared at room temperature from 9.9 kg. of polypropylene (prepared with the aid of stereospecific catalysts and having an intrinsic viscosity [$\eta$], as determined in tetrahydronaphthaline at 135° C., of 1.34, a residue from heptane extraction of 93.4%, and an ash content of 0.028%) and 100 g. of lauryl $\beta$-thiopropionate.

The polymer-stabilizer mix when subjected to melting in a test tube kept in a thermostatic bath at 250° C. for 10 minutes, gives an almost colorless molten mass.

The mix is spun in a melt spinning device under the following conditions:

| | |
|---|---|
| Screw temperature | 240° C. |
| Head temperature | 230° C. |
| Spinneret temperature | 230° C. |
| Maximum pressure | 40 k.g./cm.$^2$ |
| Winding speed | 250 meters/min. |
| Spinneret type | 60/0.8 x 16 mm. |

The fibers are stretched with a stretching ratio of 1:5.3 at 130° C. The serimetric characteristics of the fibres obtained are as follows:

| | |
|---|---|
| Tenacity | g./den__ 3.3 |
| Elongation | percent__ 27 |

By the passage from stabilized polymer to stabilized fibre the intrinsic viscosity [$\eta$] is lowered to 85% of the starting value, whereas the intrinsic viscosity of the same polymer without addition of stabilizer s lowered to 74.5% of the initial value.

The stabilized yarn, when exposed for 15 hours to the action of heat in an oven provided with air circulation at 120° C. (accelerated thermal aging test), remains almost unaltered in its characteristic while a non-stabilized yarn, when subjected to the same test, becomes completely brittle.

After exposure to an ultra violet mercury lamp for 20 hours, the stabilized yarn maintains 39% of the initial tenacity, whereas in the non-stabilized yarn control the tenacity is reduced to 32% of the initial value.

After exposure to the sun light till variation of the 7th tone in the standard blue scale (290 hours of actual exposure in the summer at Terni) the stabilized yarn maintains 83% of the initial tenacity, whereas in the non-stabilized yarn control the tenacity is reduced to 28% of the initial value.

*Example 3*

In Werner type mixer a homogeneous mixture is prepared at room temperature from 9.9 kg. of polypropylene (prepared with the aid of stereospecific catalysts and having an intrinsic viscosity [$\eta$], as determined in tetrahydronaphthalene at 135° C., of 1.34, a residue from heptane extraction of 93.4%, and an ash content of 0.028%) and 100 g. of 1,4-dicyanoethoxybenzene.

The polymer-stabilizer mix, when subjected to melting in a test tube kept in a thermostatic bath at 250° C. for 10 minutes, gives an almost colorless molten mass.

The mix is spun in a melt spinning device under the following conditions:

| | |
|---|---|
| Screw temperature | 220° C. |
| Head temperature | 220° C. |
| Spinneret temperature | 230° C. |
| Spinneret type | 60/0.8 x 16 mm. |
| Maximum pressure | 40 kg./cm.$^2$ |
| Winding speed | 300 meters/min. |

The fibres are stretched with a stretching ratio of 1:5.3 at 130° C. The serimetric characteristics of the fibres obtained are as follows:

| | |
|---|---|
| Tenacity | g./den__ 4.5 |
| Elongation | percent__ 22 |

By the passage from stabilized polymer to stabilized fibre the intrinsic viscosity [$\eta$] is lowered to 84% of the starting value, whereas the intrinsic viscosity of the same polymer without addition of the stabilizer control is lowered to 74.5% of the initial value.

The stabilized yarn, when exposed for 15 hours to the action of heat in an oven provided with air circulation at 120° C. (accelerated thermal aging test), remains almost unaltered in its characteristics while a non-stabilized yarn, when subjected to the same test, becomes completely brittle.

After exposure to an ultra violet mercury lamp for 20 hours the yarn maintains 38% of the initial tenacity, whereas in the non-stabilized yarn the tenacity is reduced to 32% of the initial value.

After exposure to the sun light till variation of the 7th tone in the standard blue scale (290 hours of actual exposure in the summer at Terni) the stabilized yarn maintains 39% of the initial tenacity, whereas in the non-stabilized yarn control the tenacity is reduced to 28% of the initial value.

*Example 4*

In a Werner type mixer a homogeneous mixture is prepared at room temperature from 9.9 kg. of polypropylene (prepared with the aid of stereospecific catalysts and having an intrinsic viscosity [$\eta$], as determined in tetrahydronaphthalene at 135° C., of 1.34, a residue from heptane extraction of 93.3%, and an ash content of 0.10%), 50 g. of dicyanoethoxybenzene, and 50 g. of lauryl thiodipropionate.

The polymer-stabilizer mix, when subjected to melting in a test tube kept in a thermostatic bath at 250° C. for 10 minutes, gives an almost colorless molten mass.

The mix is spun in a melt spinning device under the following conditions:

| | |
|---|---|
| Screw temperature | 200° C. |
| Head temperature | 200° C. |
| Spinneret temperature | 200° C. |
| Spinneret type | 60/0.8 x 16 mm. |
| Maximum pressure | 35 kg./cm.$^2$. |
| Winding speed | 400 meters/min. |

The fibres are stretched with a stretching ratio of 1:5.3 at 130° C. The serimetric characteristics of the fibres obtained are as follows:

| | |
|---|---|
| Tenacity | g./den 4.38 |
| Elongation | percent 17.6 |

By the passage from stabilized polymer to stabilized fibres the intrinsic viscosity [$\eta$] is lowered to 98% of the starting value, whereas the intrinsic viscosity of the same polymer without addition of stabilizer is lowered to 81% of the initial value.

The stabilized yarn, when exposed for 15 hours to the action of heat in an oven provided with air circulation at 120° C. (accelerated thermal aging test), remains almost unaltered in its characteristics while a non-stabilized yarn, when subjected to the same test, becomes completely brittle.

After exposure to an ultra violet mercury lamp for 20 hours, the stabilized yarn maintains 43% of the initial tenacity, while in the non-stabilized yarn the initial tenacity is reduced to 34.5%.

After exposure to the sun light till variation of the 7th tone in the standard blue scale (290 hours of actual exposure in the summer at Terni) the stabilized yarn maintains 69% of the initial tenacity, whereas in the non-stabilized yarn control the tenacity is reduced to 36% of the initial value.

*Example 5*

In a Werner type mixer a homogeneous mixture is prepared at room temperature from 9.9 kg. of polypropylene (prepared with the aid of stereospecific catalysts and having an intrinsic viscosity [$\eta$], as determined in tetrahydronaphthalene at 135° C. of 1.40, a residue from heptane extraction of 93.3%, and an ash content of 0.10%), 50 g. of octadecylcyano ethylamine and 50 g. of lauryl thiodipropionate.

The polymer stabilized mix, when subjected to melting in a test tube kept in a thermostatic bath at 250° C. for 10 minutes, gives an almost colorless molten mass.

The mix is spun in a melt spinning device under the following conditions:

| | |
|---|---|
| Screw temperature | 200° C. |
| Head temperature | 200° C. |
| Spinneret temperature | 200° C. |
| Spinneret type | 60/0.8 x 16 mm. |
| Maximum pressure | 55 kg./cm.$^2$. |
| Winding speed | 400 meters/min. |

The fibres are stretched with a stretching ratio of 1:5.3 at 130° C. The serimetric characteristics of the fibres obtained are as follows:

| | |
|---|---|
| Tenacity | g./den 4.31 |
| Elongation | percent 21.6 |

By the passage from stabilized polymer to stabilized fibre the intrinsic viscosity [$\eta$] is lowered to 88% of the starting value, whereas the intrinsic viscosity of the same polymer without addition of stabilizer is lowered to 81% of the initial value.

The stabilized yarn, when exposed for 15 hours to the action of heat in an oven provided with air circulation at 120° C. (accelerated thermal aging test), remains almost unaltered in its characteristics while a non-stabilized yarn, when subjected to the same test, becomes completely brittle.

After exposure to an ultraviolet mercury lamp for 20 hours, the stabilized yarn maintains 41.5% of the initial tenacity while in the non-stabilized yarn control the initial tenacity is reduced to 34.5%.

After exposure to the sun light till variation of the 7th tone in the standard blue scale (290 hours of actual exposure in the summer at Terni) the stabilized yarn maintains 67% of the initial tenacity, whereas in the non-stabilized yarn control the tenacity is reduced to 28% of the initial value.

*Example 6*

In a Werner type mixer a homogeneous mixture is prepared at room temperature from 9.95 kg. of polypropylene (prepared with the aid of stereospecific catalysts and having an intrinsic viscosity [$\eta$], determined in tetrahydronaphthalene at 135° C., of 1.40, a residue from heptane extraction of 93.3%, and an ash content of 0.10%), 40 g. of dicyanoethoxybenzene, and 60 g. of lauryl thiodipropionate.

The polymer-stabilized mix, when subjected to melting in a test tube kept in a thermostatic bath at 250° C. for 10 minutes, gives an almost colorless molten mass.

The mix is spun in a melt spinning device under the following conditions:

| | |
|---|---|
| Screw temperature | 200° C. |
| Head temperature | 210° C. |
| Spinneret temperature | 200° C. |
| Spinneret type | 60/0.8 x 16 mm. |
| Maximum pressure | 45 kg./cm.$^2$. |
| Winding speed | 380 meters/min. |

The fibres are stretched with a stretching ratio of 1:5.3 at 130° C. The serimetric characteristics of the fibres obtained are as follows:

| | |
|---|---|
| Tenacity | g./den 4.38 |
| Elongation | percent 17.6 |

By the passage from stabilized polymer to stabilized fibre the intrinsic viscosity [$\eta$] is lowered to 87% of the starting value, whereas the intrinsic viscosity of the same polymer without addition of stabilizer is lowered to 81% of the initial value.

The stabilized yarn, when exposed for 15 hours to the action of heat in an oven provided with air circulation at 120° C. (accelerated thermal aging test), remains almost unaltered in its characteristics while a non-stabilized yarn, when subjected to the same test, becomes completely brittle.

After exposure to an ultra violet mercury lamp for 20 hours, the stabilized yarn maintains 45% of the initial tenacity while in the non-stabilized yarn control the initial tenacy is reduced to 34.5%.

Variations can of course be made without departing from the spirit of my invention.

Having thus described my invention, what I desire to secure and hereby claim by Letters Patent is:

1. A polymeric composition that is stable against the action of heat, aging and light, this composition comprising polyproplyene and from about 0.2 to 2%, based on the polypropylene, of a stabilizing mixture of a cyanoethyl compound selected from the group consisting of 1,4-dicyanoethoxy benzene and octadecylcyano ethylamine, and a $\beta$-thioether of an alkyl diester of propionic acid.

2. The polymeric composition of claim 1 wherein the polypropylene is crystalline polypropylene consisting prevailingly of isotactic macromolecules.

3. The composition of claim 1 wherein the amount of stabilizing mixture is from about 0.2 to 1% based on the weight of the polypropylene.

4. The polymeric composition of claim 1 wherein the stabilizing mixture contains from 1 to 99% of cyanoethyl compound.

5. The polymeric composition of claim 1 wherein the β-thioether of propionic acid is dilauryl thiodipropionate.

6. The polymeric composition of claim 1 wherein the cyanoethyl compound is 1,4-di(betacyanoethoxy) benzene.

7. The polymeric composition of claim 1 wherein the cyanoethyl derivative is octadecylcyanoethylamine.

8. The composition of claim 1 in filamentary form.

9. The composition of claim 1 in film form.

References Cited by the Examiner

UNITED STATES PATENTS

| | | | |
|---|---|---|---|
| 2,397,960 | 4/1946 | Griffins et al. | 260—45.85 |
| 2,519,755 | 8/1950 | Gribbins | 260—45.85 |
| 2,952,653 | 9/1960 | Heller | 260—31.8 |
| 2,998,405 | 8/1961 | Weldy | 260—45.9 |
| 3,143,523 | 8/1964 | Caldo | 260—45.8 |

LEON J. BERCOVITZ, *Primary Examiner.*

LOUISE P. QUAST, *Examiner.*

UNITED STATES PATENT OFFICE
CERTIFICATE OF CORRECTION

Patent No. 3,231,541　　　　　　　　　　　　　　　January 25, 1966

Cornelio Caldo

It is hereby certified that error appears in the above numbered patent requiring correction and that the said Letters Patent should read as corrected below.

Column 2, line 66, for "at troom" read -- at room --; column 3, line 37, for "75%" read -- 73% --; line 70, for "stabilizer s" read -- stabilizer is --.

Signed and sealed this 6th day of December 1966.

(SEAL)
Attest:

ERNEST W. SWIDER
Attesting Officer

EDWARD J. BRENNER
Commissioner of Patents